United States Patent [19]

Kawai et al.

[11] Patent Number: 5,212,567
[45] Date of Patent: May 18, 1993

[54] MAGNIFYING DISPLAY APPARATUS

[75] Inventors: Isao Kawai, Tokyo; Toshiyuki Taguchi, Saitama; Tetsuo Hayakawa, Ibaragi; Nobuo Tokuda, Saitama; Sanyo Nagayama, Tokyo, all of Japan

[73] Assignee: Neitz Instruments Co., Ltd., Tokyo, Japan

[21] Appl. No.: 595,825

[22] Filed: Oct. 10, 1990

[51] Int. Cl.$^5$ ............................................... H04N 1/40
[52] U.S. Cl. .................... 358/451; 358/475; 358/473
[58] Field of Search ............... 358/401, 405, 408, 451, 358/453, 473, 474, 475, 484, 483, 494, 94; 382/58, 59; 340/94, 95, 825.1

[56] References Cited

U.S. PATENT DOCUMENTS

| | | | |
|---|---|---|---|
| 3,993,865 | 11/1976 | Browne et al. | 358/494 |
| 4,115,813 | 9/1978 | Mikami | 358/94 |
| 4,916,550 | 4/1990 | Miyake et al. | 358/475 |
| 5,067,028 | 11/1991 | Ogura et al. | 358/474 |

FOREIGN PATENT DOCUMENTS 63-40981A  2/1988  Japan .................................. 382/58

Primary Examiner—Edward L. Coles, Sr.
Assistant Examiner—Jerome Grant, II
Attorney, Agent, or Firm—Rogers & Killeen

[57] ABSTRACT

A magnifying display apparatus for displaying enlarged images of characters or the like comprises a photoelectric-converting reading unit including a body and an optical system disposed in the body and having a light-path inversion prism, a magnifier lens system, an iris, an imaging device and illuminating lamp. The apparatus further comprises a controller connected to the reading unit and including a power supply circuit for the reading unit and also a control circuit for controlling the conversion of the output from the imaging device into an image output. The apparatus also comprises a display unit such as a television separably connected to the controller. A recess or a protrusion is formed on a front upper portion of the body at a position corresponding to the light-path inverting prism so as to be sensible by a user's finger, thus serving as an index of the portion of the original to be magnified and displayed. Operating means for operating iris and other mechanisms are disposed on lateral sides for easy manipulation of other finger or fingers of the user's hand gripping the reading unit body.

7 Claims, 5 Drawing Sheets

MAGNIFYING DISPLAY APPARATUS

BACKGROUND OF THE INVENTION

1. Field of the Invention

The present invention relates to a magnifying display apparatus for displaying enlarged images of characters and patterns printed on, for example, newspapers or characters which are being written by the user.

2. Description of the Related Art

A magnifying display apparatus has been known in which enlarged images of characters and so forth which are to be read by a reader having a weak eyesight or ordinary reader are displayed on a television screen.

The known magnifying display apparatus has a display device such as a television placed on a support such as a small table and a reading device disposed under the television, the reading unit having, for example, a television camera including a magnifying optical system for reading and magnifying the original image. Thus, the television and the reading means are constructed as a module. The user places the original to be read under the reading device and moves the original relative to the reading device while reading the enlarged images displayed on the television screen. Obviously, this apparatus can be used for displaying, in a greater scale, characters which are being written by the user.

This known magnifying display apparatus suffers from disadvantages in that it has only a limited portability because the display device and the reading device are constructed as a module and in that the user is obliged to move the original because the reading device is stationary.

In order to obviate these problems, the present inventors have already proposed an improved magnifying display apparatus in which the reading device and the display device are separated from each other and the reading device is further decomposed into a photoelectric reading unit and a controller which are of small sizes, thus enhancing the portability of the apparatus.

This improved magnifying display apparatus, therefore, has a photoelectric-converting reading unit including a body and an optical system disposed in the body and having a light-path inversion prism, a magnifier lens system, an iris, an imaging device and illuminating lamp, a controller connected to the reading unit through a cord and including a power supply circuit for the reading unit and also a control circuit for controlling the conversion of the output from the imaging device into an image output, and a display unit such as a television separably connected to the controller through a cord.

This improved magnifying display apparatus is easy to carry by virtue of separation of the display unit and the reading unit form each other, and exhibits an excellent magnifying performance, but is still unsatisfactory in that it is not easy to handle.

SUMMARY OF THE INVENTION

Accordingly, an object of the present invention is to provide a magnifying display apparatus of the type having a reading unit separated from the display unit, having an improved operability or handling of the reading unit.

To this end, according to the present invention, there is provided a magnifying display apparatus comprising: a photoelectric-converting reading unit including a body and an optical system disposed in the body and having a light-path inversion prism, a magnifier lens system, an iris, an imaging device and illuminating lamp, a controller connected to the reading unit through a cord and including a power supply circuit for the reading unit and also a control circuit for controlling the conversion of the output from the imaging device into an image output, and a display unit such as a television separably connected to the controller through a cord; wherein the improvement comprises a recess or protrusion formed on a front upper portion of the body at a position corresponding to the light-path inverting prism, said recess or protrusion being sensible by a user's finger and serving as an index of the portion of the original to be magnified and displayed, and an operating means for operating said iris and other member are provided on at least one lateral side of the body.

The recess or protrusion formed as the index of the portion to be displayed is located at a position naturally reached by the lower side of the fore finger of the user's hand gripping the body, thus facilitating the user to specify the portion of the original to be displayed.

The operating portion provided on the lateral side of the body can easily be manipulated by the thumb of the user's hand.

The above and other objects, features and advantages of th present invention will become clear from the following description of the preferred embodiment taken in conjunction with the accompanying drawings.

DESCRIPTION OF THE PREFERRED EMBODIMENT

A preferred embodiment of the present invention will be described with reference to the accompanying drawings.

Figure 1:
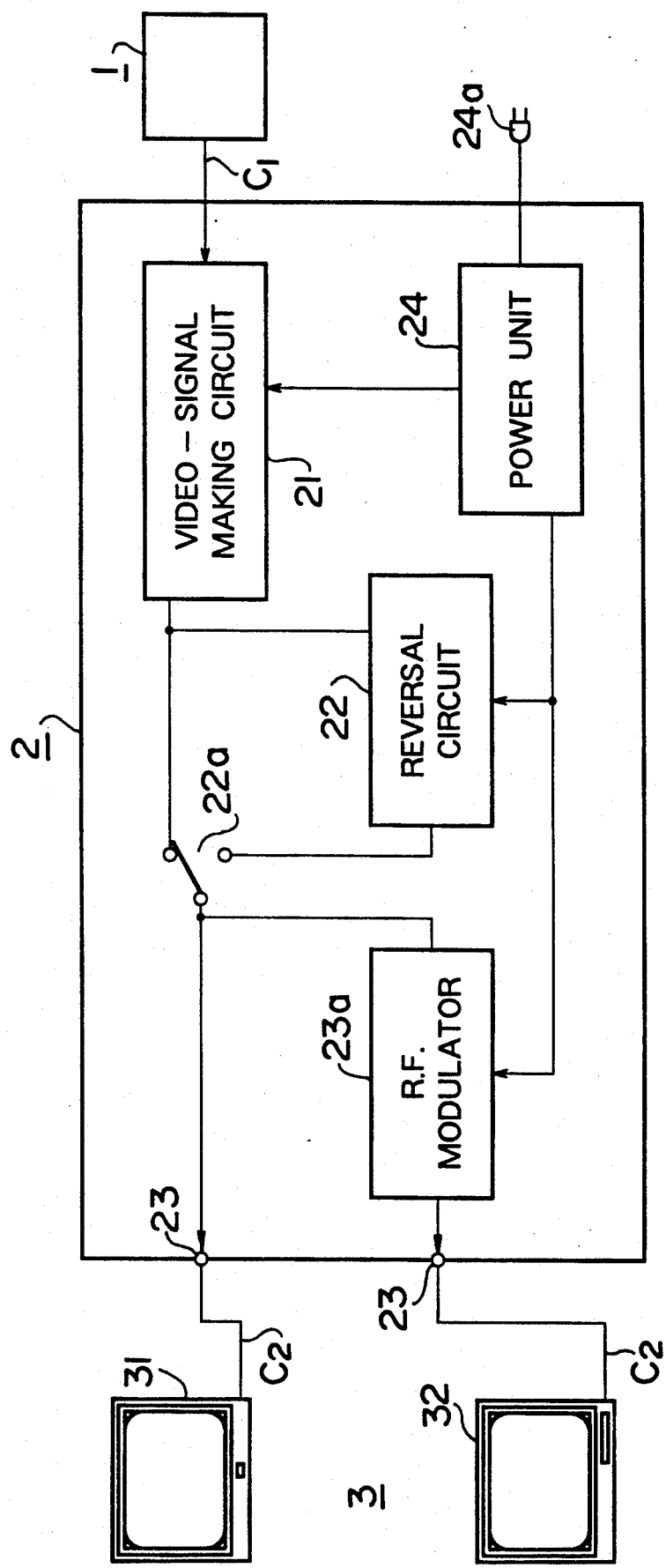
FIG. 1 is a block diagram of an embodiment of the magnifying display apparatus of the present invention.
Figure 2A:
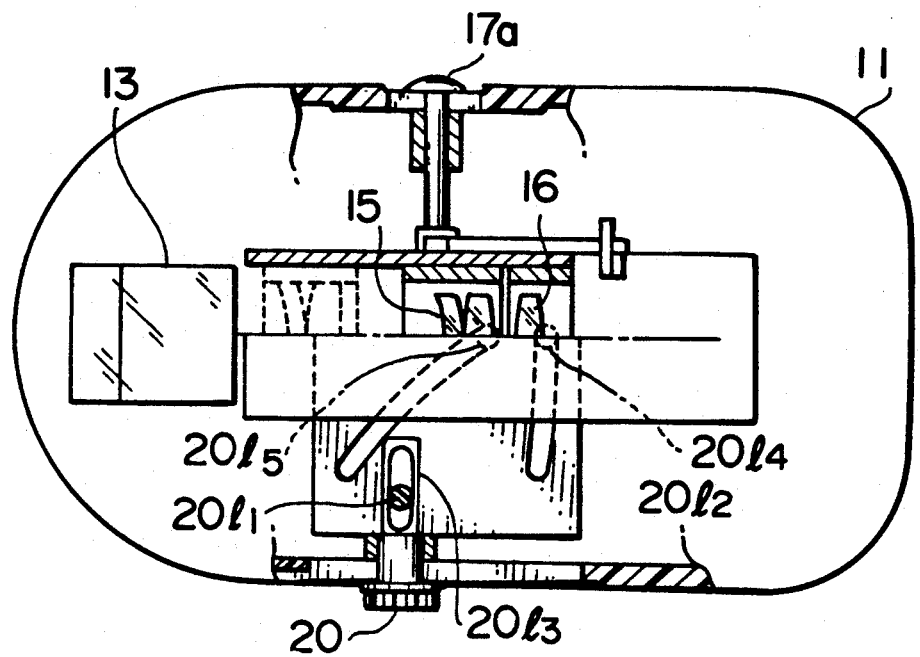
FIG. 2A is a plan view of a reading unit in the magnifying display apparatus shown in FIG. 1.
Figure 2B:
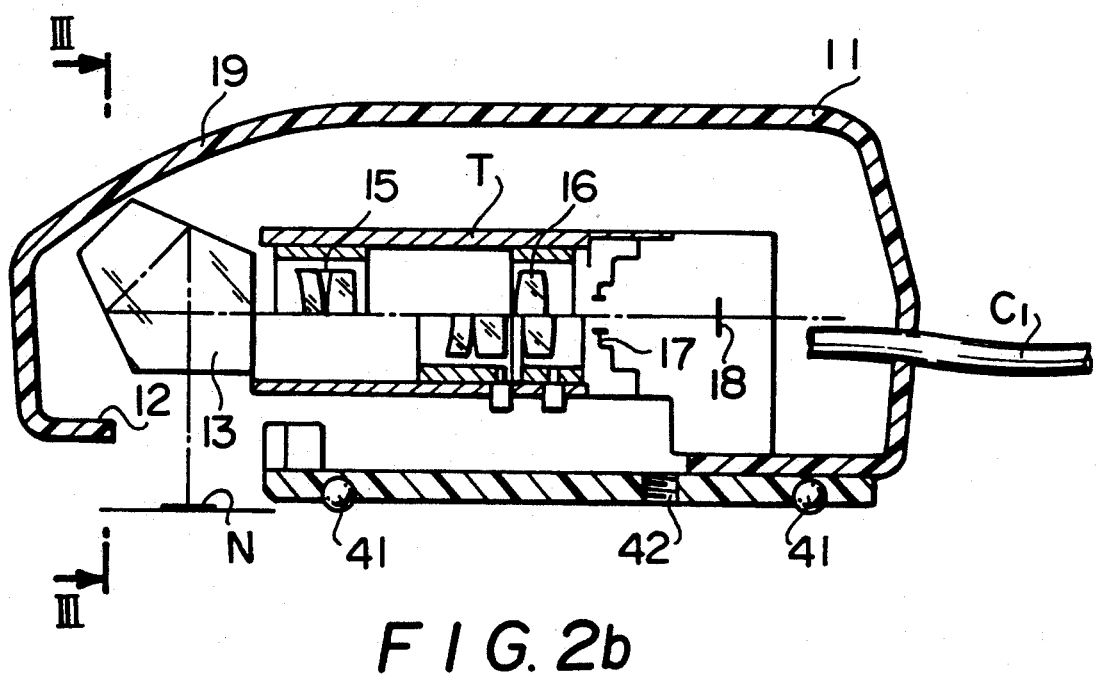
FIG. 2B is a sectional side elevational view of the reading unit.
Figure 3:
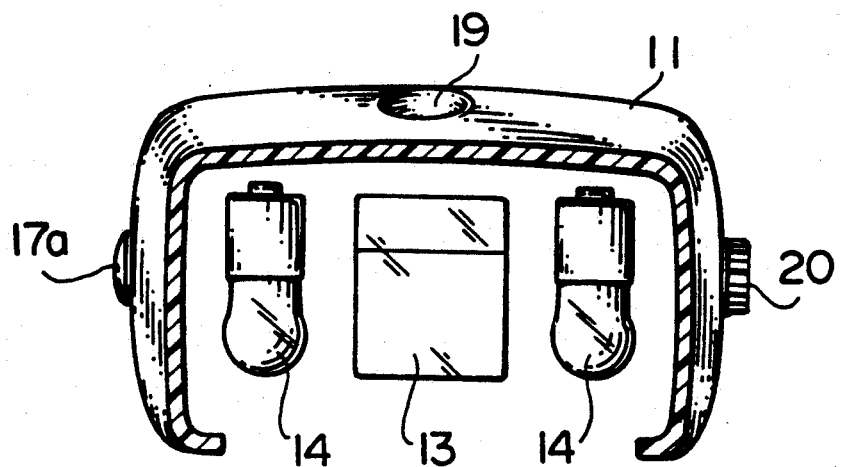
FIG. 3 is an end view of the reading unit as viewed in the direction of the arrow line III—III.

Referring to FIG. 1, a magnifying display apparatus of the present invention has a reading unit 1 which optically reads and enlarges characters or the like on an original and for converting the read characters into electric signals. The apparatus also has a controller 2 which includes a video signal forming circuit 21 which receives the electric signals from the reading unit through a connecting cable $C_1$, an inversion circuit 22 for conducting inversion of the video signals from the circuit 21 between positive and negative modes and an output portion 23 having a parallel RF modulator 23a for VHF or UHF output. Numeral 3 denotes a television which is connected through a cord C₂ to the output portion 23. The output portion 23 has a composite output terminal 23b which leads from the inversion circuit 22 and to which a monitor television 31 is connectable and an output terminal which leads from the RF modulator 23a and to which an ordinary household television 32 is connectable. Numeral 24 denotes a power supply provided in the controller 2 and having a connector plug 24a. The power supply 24 also supplies power to the reading unit 1. The video signal forming circuit 21 may be incorporated in the reading unit 1. In such a case, the controller 2 and the reading unit 1 can be connected in a wireless manner.

Figure 6:
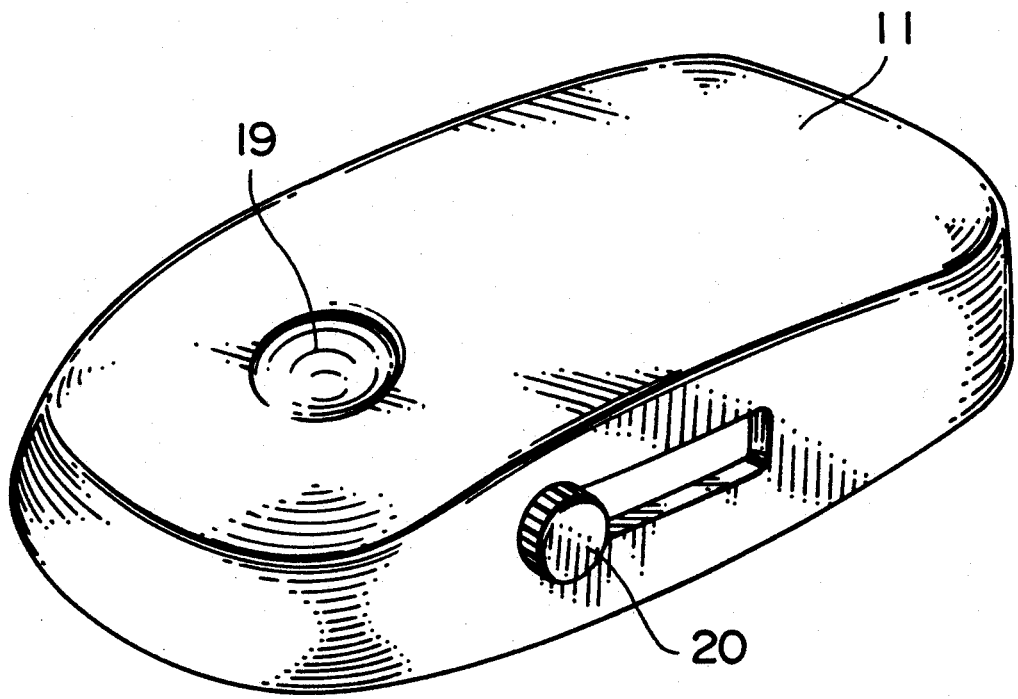
FIG. 6 is a perspective view of a body of the reading unit.
Figure 4A:
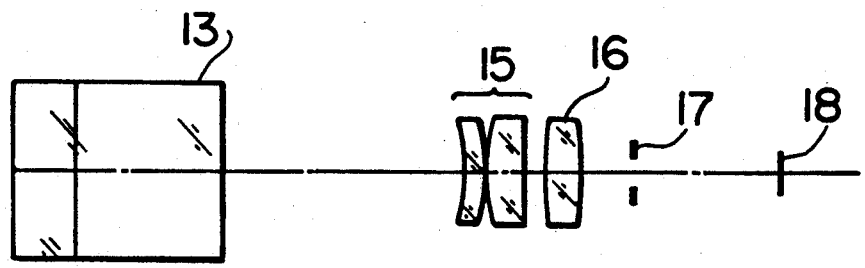
FIGS. 4A and 4B are plan views of different examples of the optical systems incorporated in the reading unit.
Figure 4B:
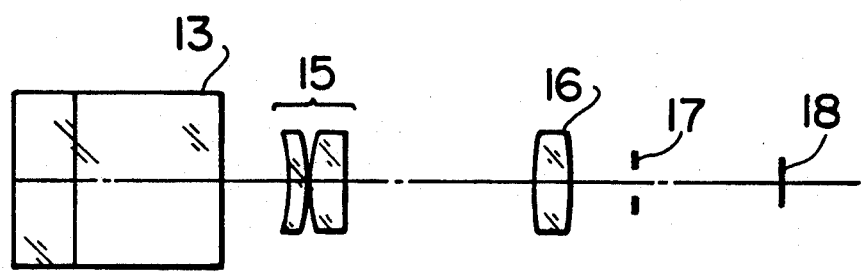
Figure 5:
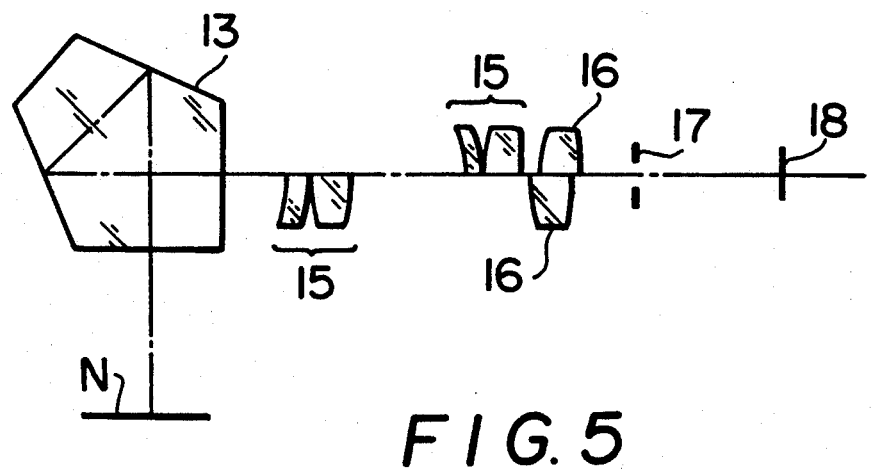
FIG. 5 is a side elevational view illustrative of the magnifying positions of lenses 15 and 16 incorporated in the optical system shown in FIGS. 4A and 4B.

The reading unit 1 has a shallow box-shaped body 11 (see FIG. 6) of a size just received under the palm of the user's hand and accommodating an optical system which will be explained in connection with FIGS. 2 to 5.

Referring to FIGS. 2 to 5, the body 11 has a reading window 12 formed in a front bottom portion thereof. The body 11 accommodates a light-path changing prism 13 disposed right above the window 12, a pair of lamps 14 (see FIG. 3) disposed on both sides of the prism 13 and serving as an illuminating light source, and lenses 15, 16 which form a magnifying lens system. As will be seen from FIGS. 4A and 4B, these lenses 15 and 16 are movable in an interlocked manner along the reflection optical system of the prism 13 so as to realize a magnification in a zooming fashion.

In this embodiment, the lenses 15 and 16 are movable in the lens barrel T by a sliding motion of a magnifier lever 20 through the action of a lens actuating mechanism 20₁ to 20₅.

Numeral 17 designates an iris which is disposed in the body 11 at a position on the reflection optical axis of the prism 13 behind the magnifier lenses 15 and 16. The iris 17 is operable to increase and decrease the aperture diameter by the operation of an iris lever 17a provided on one lateral side of the body 11. Numeral 18 designates a solid state imaging device disposed behind the iris 17. In this embodiment, a MOS type element is used as the solid state imaging device, through it is not exclusive. The output from this solid state imaging device is used as the read signal. In a specific form of the invention, the video signal forming circuit 21 in the controller 2 is incorporated in the reading unit 1. In such a case, the video signal forming circuit 21 and the imaging device 18 are connected to each other within the body and the read signals are derived from the output side of the video signal forming circuit 21.

Numeral 19 denotes a recess which is formed in the top surface of the body 11 adjacent to the front end thereof. The recess 19 is positioned substantially above the incident optical axis of the prism 13. The arrangement is such that the recess is located at a position right above the portion of the original N which is being read. Thus, the recess 19 serves as an index of the portion of the original to be magnified and displayed. Obviously, the recess can be substituted by a protrusion, since such an index need only be sensed by a user's finger.

Balls 41 are provided on four corners of the bottom surface of the body 11 so as to roll on the original N thereby enabling the body 11 to be easily slided in any direction. Obviously, the balls 41 may be substituted by other suitable rolling members such as rollers mounted orthogonally or parallelly to the longitudinal axis of the body 11. The rollers, when mounted such that their axes are parallel to the longitudinal axis of the body 11, are suited to reading of an original in which characters are written along horizontal lines, whereas the rollers with axes orthogonal to the body axis are suited to reading of characters written along vertical lines. The use of rollers in place of the balls undesirably restricts the direction of movement of the body 11 but this does not cause any practical problem because the body 1 can easily be turned through 90° to suit to reading of vertical or horizontal lines of characters.

Numeral 42 designates a screw hole formed in the rear portion of the bottom wall of the body 11. A fixing screws 6 is adapted to be driven into this hole when the body 11 is to be fixed to a stand S as will be explained later.

In use, the user places the body 11 of the reading unit 1 on the portion of the original N to be read and moves the same along the portion of the original to be read while being guided by the recess 19 which serves as an index. In consequence, the images of characters illuminated by the light from the lamps 14 are projected in a greater scale onto the imaging device 18 through the prism 13, the magnifier lens 15 or 16, or the iris 17.

The imaging device 18 converts the lights of image of characters projected through the iris 17 into electrical read signals and transmits the read signals to the controller 2 through the cable C₁.

The read signals from the imaging device 18 are received by the video signal forming circuit 21 of the controller 2 which converts the receiving signal into video signals. The video signals are supplied, through the inversion circuit 22 or bypassing the same, to the monitor television 31 or the ordinary household television 32 connected to the controller 2, via the cable C₂. In consequence, the television 31 or 32 successively displays the enlarged images of the characters on the original N read by the reading unit 1. Obviously, the transmission of signals from the controller 2 to the television 32 may be conducted in a wireless manner.

The embodiment described hereinbefore is intended for magnifying display of characters or the like on the original N which is to be read. The apparatus of the present invention, however, can be used also for the purpose of enabling the television 31 or 32 to display enlarged images of characters which are being written by the user. In such a case, the body 11 of the reading unit 1 is fixedly mounted in a stand S shown in FIG. 7.

Figure 7:
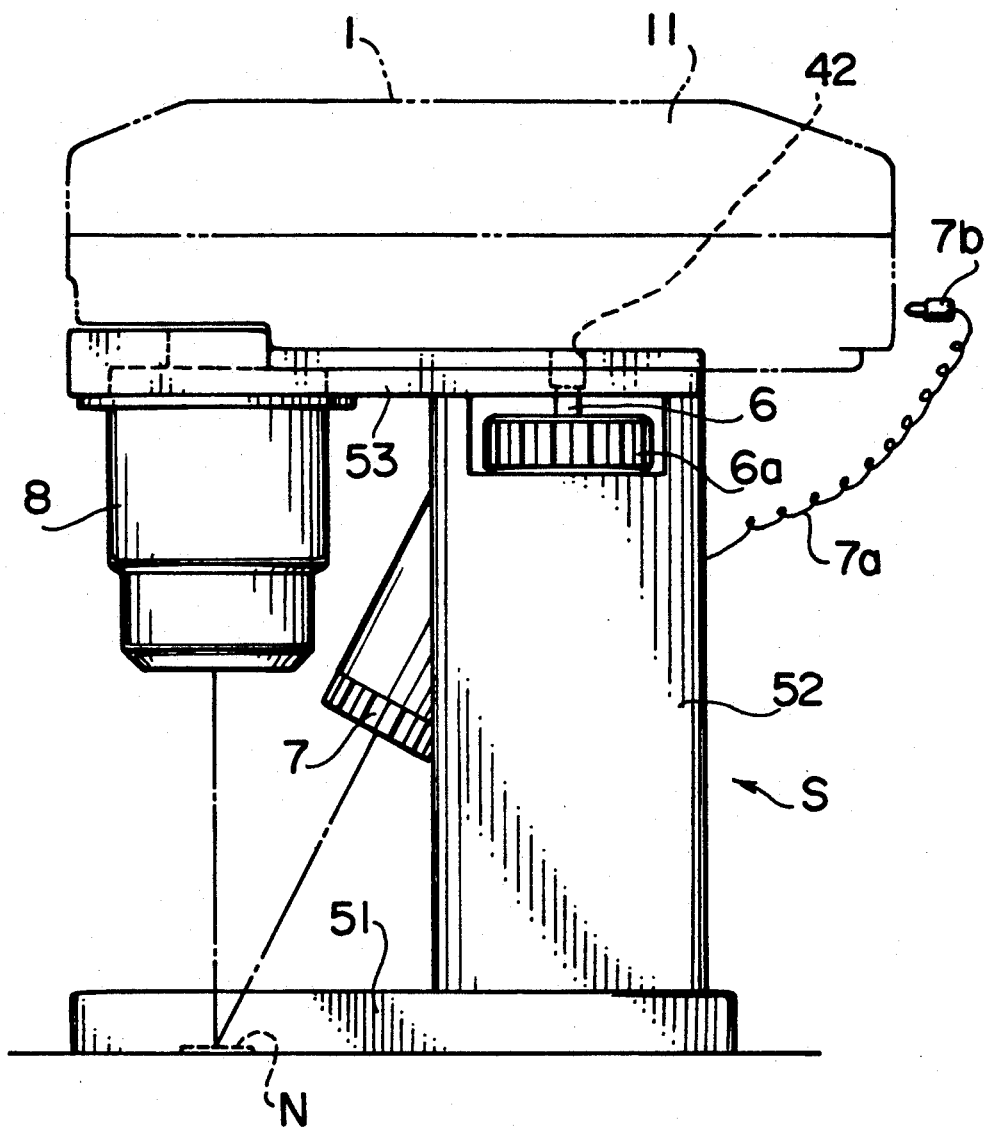
FIG. 7 is a side elevational view of the reading unit placed on a table.

More specifically, referring to FIG. 7, the stand S has a base member 51 having a substantially U-shaped planar form, a support member 52 provided behind the base member 4, a body mounting seat 11 overhanging forwardly from an upper portion of the support member 52, and the aforementioned screw 6 retained by the mounting seat 53 at a position corresponding to the screw hole 42 formed in the bottom wall of the body 11. The screw has a knob 6a. The arrangement is such that the user can drive the screw 6 by fingers nipping the knob 6a into the screw hole 42 so that the body 11 of the reading unit 1 can be fixedly mounted on the body mounting seat 53 of the stand S.

A stand illuminating light source 7 is mounted on the support member 52 so as to direct a light to a position in the vicinity of the point where the incident optical axis of the prism 13 of the body 11 crosses the original N. The electrical power supply is automatically switched to supply the power to the light source 7 as a power supply cord 7a is inserted into a receptacle or outlet (not shown) provided in the body 11. Numeral 8 denotes an objective lens barrel provided on the body mounting seat 53. The configuration and construction of the stand S shown in FIG. 7 are only illustrative and the stand S can have various other suitable designs. All what is required for the stand S is that it can hold the body 11 at a height suitable for enlarging the image on the original N.

As has been described, in the magnifying display apparatus of the present invention, the reading device, separated from the display device such as a television is further decomposed into the reading unit and the controller, unlike the conventional apparatus in which the reading device is integral with the display device to impair portability of the apparatus. The reading unit is shaped and sized such that it can be just covered by the user's hand and is connected to the controller through a cord or in a wireless manner. Thus, any television set can be usable as the display device of this magnifying display apparatus, since the user can easily carry the controller and the reading unit to a location near such a television set.

The invention also offers the following advantages besides the merits described above.

The user can easily locate the body of the reading unit in relation to the position of the portion of the original to be read and displayed, since the recess or protrusion formed on the top surface of the body conveniently functions as a guide or index of the position of the above-mentioned portion of the original. The user, while holding the body of the reading unit, can easily manipulate the knob, slide or lever for operating the iris and zooming mechanism, since such knob, slide and lever are provided on the lateral side of the body 11 within the natural reach of the user's thumb. This should be contrasted to the conventional apparatus in which the user has to pick up the body apart from the original surface for manipulation of the iris and other mechanisms.

When the body of the reading unit is fixed to the stand, the apparatus of the invention can be used also for the purpose of magnifying display of characters which are being written by the user, as well as for reading purpose. When the apparatus is used for displaying characters which are being written, the separate illumination source on the stand conveniently illuminates the original placed under the reading unit.

What is claimed is:

1. A magnifying display apparatus comprising: a photoelectric-converting reading unit including a body and an optical system disposed in the body and having a light-path inversion prism, a magnifier lens system, an iris, an imaging device and illuminating lamp, a controller connected to the reading unit through a cord and including a power supply circuit for the reading unit and also a control circuit for controlling conversion of the output from the imaging device into an image output, and a display unit such as a television separably connected to the controller through a cord; wherein the improvement comprises tactile indicator formed on a front upper portion of the body at a position corresponding to the light-path inverting prism, the size of the body being compatible with a human hand, said tactile indicator being sensible by a user's finger and serving a an index of the portion of the original to be magnified and displayed, and an operating means for operating said iris on a lateral side of the body.

2. A magnifying display apparatus according to claim 1, further comprising means for operating the magnifier lens system on a lateral side of the body.

3. A magnifying display apparatus according to claim 1, wherein the power supply circuit in the body for supplying the illuminating lamp in the body is automatically switched to supply electrical power to a separate illumination system on a stand when said body is set on said stand.

4. An improved reading unit for a magnifying display apparatus for displaying an image from the reading unit, the reading unit having a prism for directing an image to a magnifier lens assembly, an iris for controlling the magnifier lens assembly aperture, and imaging means for converting the magnified image into an electrical signal to be used by the magnifying display apparatus, the improved reading unit comprising:

a case for the reading unit having a size so that the reading unit may be held in a human hand and moved in relation to images that are to be magnified by the reading unit;

a tactile indicator on an exterior surface of said case, said indicator being located in relation to the prism so as to indicate the approximate location of an image to be magnified when the reading unit is moved in relation to the images;

means for adjusting magnification of said magnifier lens on the exterior surface of said case; and means for controlling said iris on the exterior surface of said case, whereby said reading unit may be moved and operated by the fingers of one hand that are able to contact said tactile indicator, said means for adjusting and said means for controlling.

5. The improved reading unit of claim 4 wherein said means for adjusting and said means for controlling are on opposite sides of said case.

6. The improved reading unit of claim 4 wherein said case comprises low friction means for facilitating movement of said case in relation to images to be magnified by the reading unit.

7. The improved reading unit of claim 4 wherein said case comprises illumination means for illuminating an image to be magnified by the reading unit.

* * * * *